Figure 4:
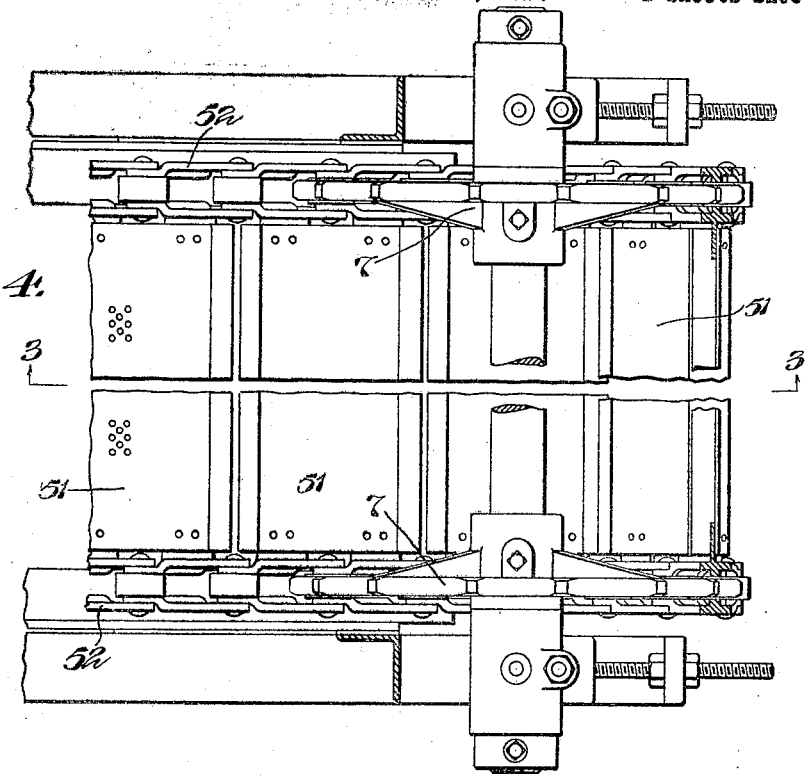

Sept. 23, 1924.
M. F. KEVLIN ET AL
1,509,239
CARBONIZING APPARATUS
Filed March 6, 1924     2 Sheets-Sheet 1
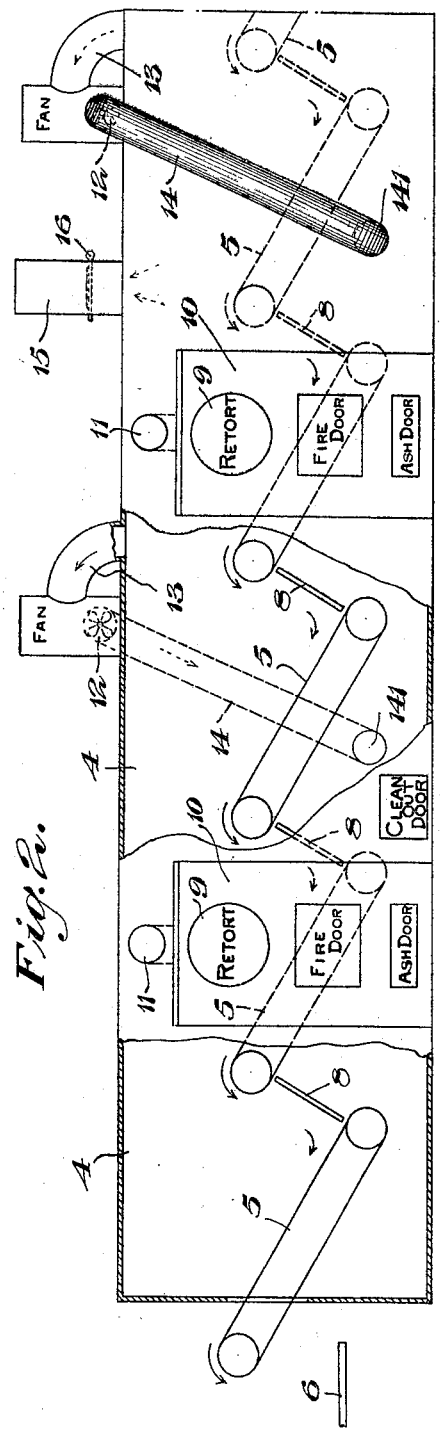
Inventors:
Matthew F. Kevlin
Julian S. Jacobs
by Chas. F. Randall
Attorney.

Sept. 23, 1924.

M. F. KEVLIN ET AL

CARBONIZING APPARATUS

Filed March 6, 1924

1,509,239

2 Sheets-Sheet 2

Inventors:
Mathew F. Kevlin
Julian S. Jacobs
By Chas. F. Randall
Attorney.

Patented Sept. 23, 1924.

1,509,239

UNITED STATES PATENT OFFICE.

MATHEW F. KEVLIN, OF PHILADELPHIA, PENNSYLVANIA, AND JULIAN S. JACOBS, OF SPRINGFIELD, VERMONT, ASSIGNORS TO JOHN T. SLACK CORPORATION, OF SPRINGFIELD, VERMONT, A CORPORATION OF VERMONT.

CARBONIZING APPARATUS.

Application filed March 6, 1924. Serial No. 697,251.

*To all whom it may concern:*

Be it known that we, MATHEW F. KEVLIN and JULIAN S. JACOBS, citizens of the United States, residing at Philadelphia, in the county of Philadelphia, State of Pennsylvania, and Springfield, county of Windsor, State of Vermont, respectively, have invented a certain new and useful Improvement in Carbonizing Apparatus, of which the following is a specification, reference being had therein to the accompanying drawings.

The invention has relation to apparatus of the class employed for carbonizing vegetable fibers and other vegetable matter contained in wool stock, such as wool in the loose unspun state, or rags. The invention has for its object to provide improved apparatus capable of continuous action in, preferably, first thoroughly drying the stock, whether in the form of loose unspun fiber or of rags, and then conveying the stock into and through a chamber in which the atmosphere is charged with a carbonizing reagent in gasified form, and discharging the stock from the said chamber when sufficiently treated.

Carbonizing apparatus in accordance with the invention comprises, essentially, a closed chamber, one or more retorts by which a carbonizing reagent is gasified and the resultant gas supplied to the said chamber, and a plurality of endless traveling conveyor aprons within the said chamber, with preferably a continuous dryer by which dried stock is fed to the first of the said conveyor aprons. One of the said aprons constitutes a receiving apron to which the dried stock is supplied, the stock being fed to such apron by the dryer when the latter is arranged to provide for such feeding. The aprons successively support the stock and feed it along within the chamber, and are arranged so that the stock is dropped in a loose state from a relatively elevated delivery portion of one thereof to a relatively lower receiving portion of the next succeeding one, and so on in succession, and so that the final apron discharges the treated stock from the chamber. We further provide the apparatus with means for producing a circulation of the atmosphere within the chamber by causing a flow of gas, etc., to take place from the upper portion of the interior space downward through flues discharging into the said space again at points below the conveyor aprons.

Figure 3:
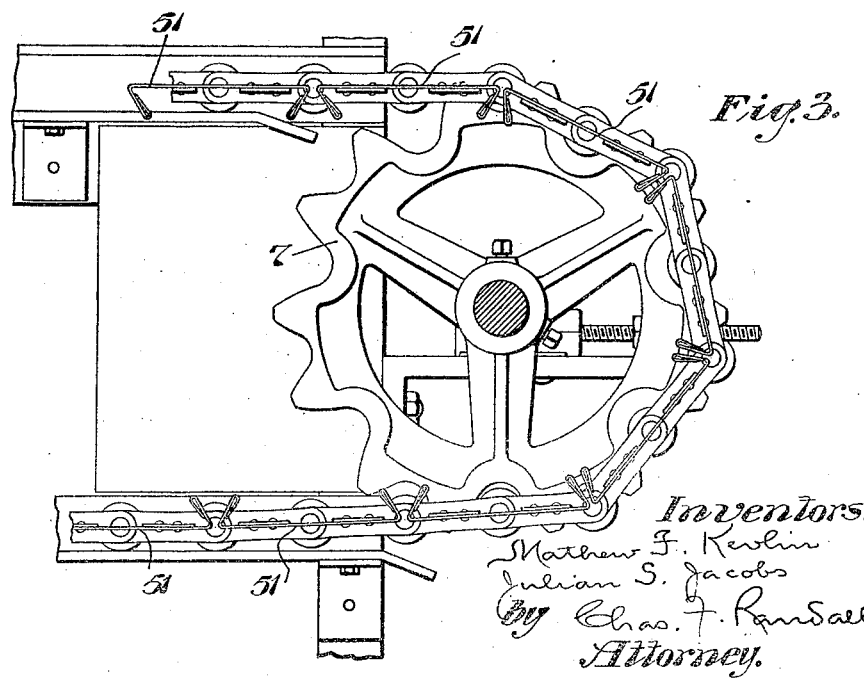

An illustrative embodiment of the invention is shown in the drawings, in which latter the first two views jointly show an apparatus constituting the said embodiment. Fig. 1 is a view showing a dryer and the adjacent receiving portion of the closed chamber, etc., while Fig. 2 shows the remainder of the apparatus to and including the delivery end of the said chamber. Fig. 3 is a sectional view on an enlarged scale showing a portion of one of the conveyor aprons, together with the supporting and actuating sprocket-wheels for such apron. Fig. 4 is a plan view of the parts shown in Fig. 3.

A dryer is conventionally represented at 1, it being shown equipped with a feeding apron 2 upon which is to be placed the stock intended to be fed thereby into the dryer. The dryer may be of any convenient approved type producing a continuous movement of the stock therethrough, and delivering the dried stock at the point indicated by the numeral 3. At 4 is the closed chamber within which the stock operated upon is subjected to a gasified carbonizing reagent, and at 5, 5, etc., are the conveyor aprons within the said chamber. In this instance the plurality of aprons employed are disposed in a series extending lengthwise of the chamber. At the end of the chamber at which the dryer is located, the conveyor apron constituting the first of the said series extends into position to receive the dried stock from the delivery of the dryer, the receiving portion of such apron projecting in this instance out through an opening in the corresponding end wall of the chamber. At the opposite end of the chamber the conveyor apron constituting the last of the series is arranged to discharge the treated stock from the chamber, the delivering portion of the said conveyor apron being shown projecting out through an opening in the adjacent end wall of the chamber, and a table 6, only a portion of which is shown, being located in position to receive the treated stock as it falls from such apron. The respective conveyor aprons 5, 5, are traveling endless aprons and may be of any approved character suitable for employment for carbonizing purposes. In practice they are composed of metal, and are of openwork construction, such construction comprising preferably slats 51, 51, Figs. 3 and 4, connected together by means of sprocket-chains 52, 52. They are mounted upon suitable supporting and actuating wheels or rolls, preferably sprocket-wheels 7, 7, Figs. 3 and 4. The respective aprons of the series aforesaid, as shown in the drawings, are disposed in inclined positions, with the delivery portion of the first apron of the series above the receiving portion of the second apron, and so on throughout the series. Because of this arrangement and relative location, the stock carried by one apron falls from the delivery portion of one apron upon the receiving portion of the next apron, landing thereon in a loose and open state. At 8, 8, are shown plates disposed in inclined positions below the delivery portions of the respective aprons, whereby the stock in falling is properly guided to the receiving portions of the aprons, and prevented from falling away from the lower ends of the aprons.

The number of aprons comprised in the series may vary in practice. At each delivery from one apron to the next the stock in falling from the former to the latter lands upon the receiving apron in a loosened state and becomes turned over more or less, those portions of the stock which were the least fully exposed to the gas while carried by one apron being more fully exposed thereto while carried by the next succeeding apron, so that the several repetitions of the transfer from one apron to the next, and consequent repeated loosening, etc., secures improved results in respect of bringing about more thoroughly subjection of the stock to the carbonizing gas, while at the same time the process is expedited.

The gas utilized to carbonize the vegetable matter present in the stock fed into the chamber is generated in one or more retorts 9, 9, contained in furnaces 10, 10, which latter may advantageously be located outside the closed chamber 4, such retorts communicating with the interior of the chamber through pipes 11, 11. In practice, the acid to be gasified is fed at the proper rate of supply into the respective retorts by suitable means, not necessary to be shown. The openings leading into the retorts are closed by suitable doors or covers.

The means aforesaid for producing a circulation of the atmosphere as stated within the chamber comprises one or more fans 12, 12, having their fan-casings connected by inlet pipes 13, 13, with the interior space of the chamber at the top thereof, and with flues 14, 14, extending from the said fan-casings and discharging at 141 into the lower portion of the said space beneath certain of the conveyor aprons 5, 5.

In order to permit escape of the gas-laden atmosphere from the chamber whenever such escape becomes necessary for any reason, we provide one or more chimneys or outlet pipes 15. The outlet or outlets for gases thereby constituted may be closed as required by means of a damper or dampers 16, which may be opened when necessary.

What is claimed as the invention is:

1. Wool carbonizing apparatus comprising the combination with a closed chamber, and a retort by which a carbonizing reagent is gasified and the gas supplied to the said chamber, of a series of endless traveling conveyor aprons within said chamber, successively supporting the stock, feeding it along within the chamber, and respectively dropping the stock in a loose state from a relatively elevated delivery portion of one thereof to a relatively lower receiving portion of the next succeeding apron.

2. Wool carbonizing apparatus comprising the combination with a continuous dryer, a closed chamber, and a retort by which a carbonizing reagent is gasified and the gas supplied to the said chamber, of a series of endless traveling aprons within the said chamber, to the first of which the dried stock is supplied by the said dryer, said aprons successively supporting the stock, feeding it along within the chamber until the stock is delivered by the final apron, and respectively dropping the stock in a loose state from a relatively elevated delivery portion of one thereof to a relatively lower receiving portion of the next succeeding apron.

3. Wool carbonizing apparatus comprising the combination with a closed chamber, and a retort by which a carbonizing reagent is gasified and the gas supplied to the said chamber, of a series of endless traveling conveyor aprons within said chamber, successively supporting the stock, feeding it along within the chamber, and respectively dropping the stock in a loose state from a relatively elevated delivery portion of one thereof to a relatively lower receiving portion of the next succeeding apron, and a fan and flue arrangement by means of which the gas-charged atmosphere is withdrawn from the upper portion of the interior space of the chamber and discharged into the lower portion of such space below the conveyor aprons.

4. Wool carbonizing apparatus comprising the combination with a continuous dryer, a closed chamber, and a retort by which a carbonizing reagent is gasified and the gas supplied to the said chamber, of a series of endless traveling aprons within the said chamber, to the first of which the dried stock is supplied by the said dryer, said aprons successively supporting the stock, feeding it along within the chamber until the stock is delivered by a final apron, and respectively dropping the stock in a loose state from a relatively elevated delivery portion of one thereof to a relatively lower receiving portion of the next succeeding apron, and a fan and flue arrangement by means of which the gas-charged atmosphere is withdrawn from the upper portion of the interior space of the chamber and discharged into the lower portion of such space below the conveyor aprons.

MATHEW F. KEVLIN.
JULIAN S. JACOBS.